Oct. 31, 1967  A. G. AHLSTONE  3,350,103
SEAL RING HOLDING DEVICE
Original Filed Aug. 2, 1965
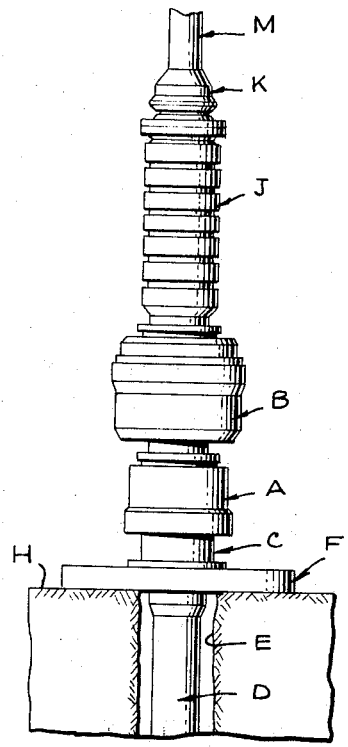
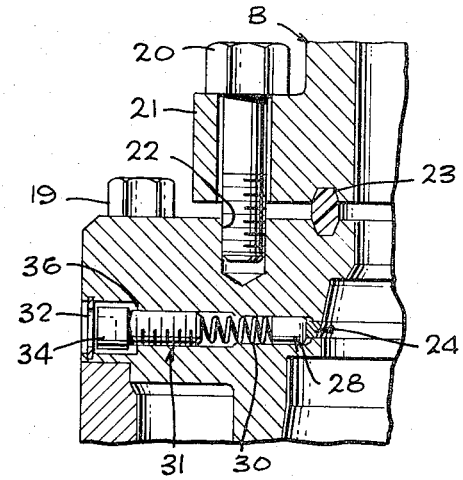
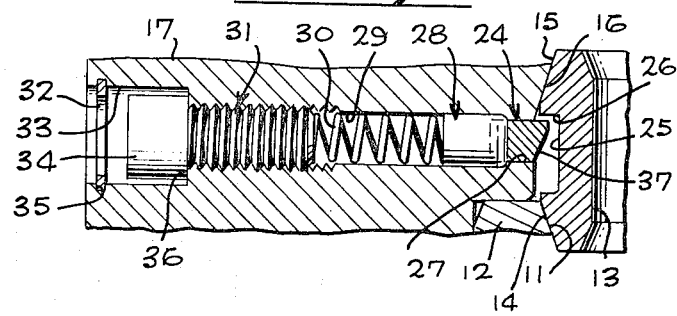
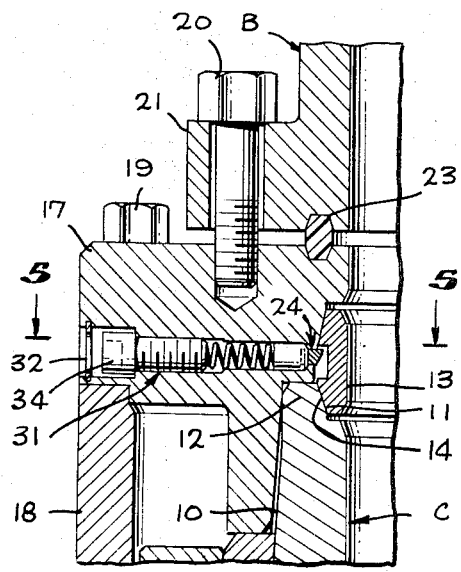
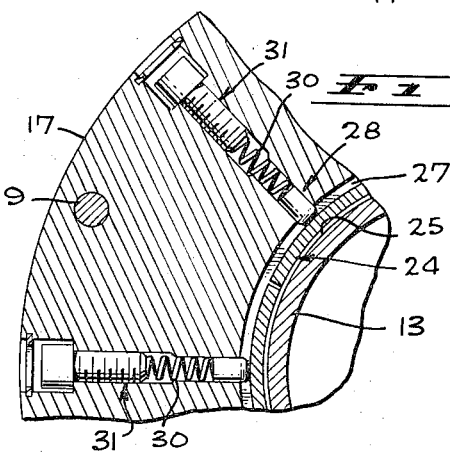
INVENTOR.
ARTHUR G. AHLSTONE
BY
Bernard Kriegel
ATTORNEY

United States Patent Office 3,350,103
Patented Oct. 31, 1967

3,350,103
SEAL RING HOLDING DEVICE
Arthur G. Ahlstone, Ventura, Calif., assignor to Ventura Tool Company, Ventura, Calif., a corporation of California
Original application Aug. 2, 1965, Ser. No. 476,417. Divided and this application Sept. 20, 1965, Ser. No. 488,347
9 Claims. (Cl. 277—9)

This application is a division of my application for "Coupling Apparatus for Well Heads and the Like," Ser. No. 476,417, filed Aug. 2, 1965.

The present invention relates to well equipment, and more particularly to connector or coupling apparatus for releasably securing various well components to one another, as at the location of the well head.

In the drilling of oil and gas wells at an underwater site, a coupling is used for connecting components to one another in sealed or pressure tight relation. It is usual for the upper portion of the coupling to contain a seal or gasket ring retained in place by a suitable device, this seal ring being brought into sealing relation with a lower device previously installed at the underwater location. At times, the upper portion of the coupling and the seal ring are elevated to the drilling rig, which allows the seal ring to be inspected, and, if required, replaced.

Heretofore, difficulty has been encountered in installing, removing and reinstalling seal rings in their associated coupling members, requiring considerable time and entailing great expense at an offshore location because of the large cost of offshore operations. In addition, damage to the seal rings and to their sealing surfaces oftentimes occurs.

Accordingly, it is an object of the present invention to provide a device for retaining a seal ring and the like in a coupling member that enables the seal ring to be easily assembled in the coupling member and readily removed therefrom.

Another object of the invention is to provide a device for retaining a seal ring and the like in a coupling member, in which assembly of the retention device with respect to the seal ring and its disassembly therefrom can be accomplished without damage to the seal ring, and particularly to its sealing surfaces. Moreover, such assembly and disassembly can be accomplished in a minimum of time.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 1 is a diagrammatic view of well bore drilling equipment at an underwater well site, including a connector embodying the invention;

FIG. 2 is a vertical section through a portion of the connector or coupling disclosed in FIG. 1, with the seal ring in place and sealed against a companion member, such as a well head;

FIG. 3 is a view similar to FIG. 2 illustrating the upper coupling member with the seal ring removed therefrom;

FIG. 4 is an enlarged section through the seal ring and retaining device illustrated in FIG. 2;

FIG. 5 is a section taken along the line 5—5 on FIG. 2.

The invention is illustrated in the drawings as being applied to a fluid or hydraulically operated connector or coupling apparatus A for connecting a blowout preventer B to a well head C forming the upper portion of a foundation pile D disposed and secured within a well bore E, and attached to a suitable pad F resting upon the bottom of floor H of an ocean. The blowout preventer B is secured through a flexible joint J and a connector K to a marine conductor pipe M extending upwardly to a drilling vessel or barge (not shown) floating in the ocean or other body of water. The barge carries the usual drilling equipment for drilling the well bore. The hydraulic connector A, blowout preventer B, flexible joint J and marine conductor pipe M are lowered through the body of water to the well head C for the purpose of effecting an attachment of the hydraulic connector thereto, in the manner specifically described in the above-identified parent application, Ser. No. 476,417, either through the aid of a diver, or in the absence of a diver.

The tubular foundation pile D of any suitable length is secured within the well bore E, the casing head C extending above the pad F that rests upon the bottom H of the ocean. The well head C has an outer surface 10 of a suitable shape and a downwardly tapering internal sealing face 11 at its upper terminal 12. A seal or gasket ring 13 has a lower external tapered face 14 adapted to mate against the internal sealing surface 11 of the well head, and it also has an upper external tapered face 15 adapted to seal against a companion tapered surface 16 in the upper portion of an adapter 17 forming part of the connector apparatus A. This adapter is secured to the main body portion 18 of the connector apparatus by a plurality of screws 19, and, as illustrated in FIG. 2, fits over the well head C, the adapter 17 and the main body 18 being secured to the well head in any suitable manner, such as described in detail in the above-identified parent application, which will bring the tapered upper and lower internal sealing surfaces 16, 11 of the adapter and the well head into firm leakproof sealing engagement with the companion upper and lower tapered surfaces 15, 14 on the seal ring 13.

As disclosed in the drawings, the adapter 17 is secured to the lower end of the blowout preventer B by screws or studs 20 extending through a lower flange 21 of the blowout preventer and threaded into bores 22 of the adapter, a gasket 23 being clamped between the blowout preventer and adapter to prevent leakage therebetween.

The seal ring 13 is retained within the adapter 17, as during lowering or elevating of the coupling device A toward or from the well head C, by a split inherently expansible coupling ring 24 disposed within a peripheral central groove 25 in the ring gasket 13, the upper end of the ring being engageable with the upper side 26 of the groove. This ring is also received within an internal circumferential groove 27 in the adapter, into which it tends to expand fully out of the external central groove 25 of the ring gasket, unless it is prevented from expanding therefrom. As specifically disclosed in the drawings, it is prevented from moving out of the external ring groove 25 by a retainer or holding device that includes a plurality of circumferentially spaced plungers 28, each of which is disposed within a radial bore 29 in the adapter 17. The inner end of a helical compression spring 30 within the bore bears against the outer end of the plunger 28 and also against a spring seat 31 threaded into the bore and insertable therewithin and removable therefrom from the exterior of the adapter. A snap retainer ring 32 is disposed in a counterbore 33 in which the head 34 of the spring seat or screw is received to prevent inadvertent removal of the spring seat 31 from the bore. This retainer ring 32 is located in a groove 35 at the outer portion of the counterbore and overlies the head 34 of the screw.

When the screws 31 are threaded fully within the bores 29, with their heads 34 engaging the bottoms or bases 36 of the counterbores, the springs 30 are compressed to an extent that overcomes the inherent expansibility of the retainer ring 24, the springs bearing against the plungers 28 which force the ring 24 inwardly and retain it within the peripheral groove 25 of the seal ring 13. When the screws 31 are threaded outwardly of the bores 29 to an extent at which their heads 34 engage the snap rings 32, they no longer contact the compression springs 30, which then exert no spring force on the plungers 28 and coupling ring 24, allowing the latter to expand inherently fully within its groove 27 and out of the peripheral groove 25 of the seal ring.

When the screws 31 are threaded fully within their bores 29 to compress the helical springs 30, the retainer ring 24 can still be expanded outwardly if sufficient force is exerted thereagainst. Such force may be exerted by the seal ring 13 itself acting upon an inner beveled or tapered surface 37 of the ring 24, which will force the latter in an outward direction and press the plungers 28 outwardly to further compress the springs 30. Such action will occur, for example, in the event the ring 13 is to be installed in the upper coupling member or adapter 17. The forcing of the adapter 17 and its retainer ring 24 downwardly over the ring 13 will cause the tapered or beveled surface 37 of the ring 24 to engage the seal ring 13 and be expanded outwardly thereby, until the adapter 17 and coupling ring 24 move over the seal ring 13 sufficiently to confront the coupling ring 24 with the peripheral groove 25 of the seal ring, whereupon the ring 24 will be forced by the helical compression springs 30 and plungers 28 into the peripheral groove 25, as disclosed in FIGS. 2, 4 and 5.

When the seal ring 13 is to be installed within the upper coupling member or adapter 17 on the drilling rig, it is placed in a ring groove of a lower portion of a coupling (not shown), which serves as a test stand and which may be of the same shape and structure as the upper portion of the well head C. The radial screws 31 are threaded inwardly to their fullest extent, in which their heads 34 engage the bottoms 36 of the counterbores 33, which will cause the springs 30 to overcome the inherent expansibility of the retainer ring 24 and shift it partially out of its internal groove 27 and inwardly of the adapter member 17. The upper coupling member A with the retainer ring 24 in such outward position is then lowered over the seal ring 13, the latter engaging the tapered surface 37 of the retainer ring and camming it outwardly, the upper coupling member 17 and retainer 24 then moving downwardly over the seal ring until the retainer ring is opposite the peripheral groove 25 of the seal ring, into which it will snap and be disposed under the upper shoulder or side 26 of the groove, for the purpose of holding the seal ring 13 in place.

If desired, the radial screws 31 may be threaded fully outwardly until they engage their snap rings 32, which will allow the retainer ring 24 to expand to its full outward position within its internal groove 27. The upper coupling device A with its retainer ring 24 is then placed over the seal ring 13 disposed on the test coupling member (not shown, but like C) until the retainer ring is opposite the peripheral groove 25, whereupon the screws 31 can be threaded inwardly to their fullest extent to compress the helical springs 30 and cause them to act through the plungers 28 to force the retainer ring 24 into the seal ring groove 25 and under its upper side or shoulder 26.

The coupling apparatus A can then be secured to the blowout preventer B, the latter being attached through the flexible joint J and connection K to the marine conductor pipe M, and this assembly lowered from the barge (not shown) toward the well head C until the adapter 17 and main body 18 move over the well head and are firmly coupled thereto, the seal ring 13 sealing against the tapered internal sealing face 11 of the well head C and also against the tapered surface 16 of the adapter or upper connector member 17.

In the event the coupling A is released from the well head C, it is elevated to the drilling barge or rig. The seal ring can be removed by unthreading the radial screws or spring seats 31 to their fullest extent to relieve the compression of the springs 30, allowing the retainer ring 24 to inherently expand within the internal groove 27 in the adapter and fully out of the external groove 25 in the seal ring 13, which will allow the seal ring to drop out of the adapter or upper coupling member 17. The seal ring 13 can be inspected and then replaced, if desired, or a new seal ring substituted for it and assembled in place in the manner described above.

I claim:

1. In a coupling device: a coupling member having a sealing surface; a seal ring having a surface adapted to seal against said sealing surface; means for supporting said seal ring on said coupling member comprising retaining means engageable with said seal ring and tending inherently to shift laterally from engagement with said seal ring to release said seal ring from said coupling member, spring means engageable with said retaining means, and means on said coupling member for energizing said spring means to cause said spring means to yieldably force said retaining means into engagement with said seal ring to support said seal ring on said coupling member, said energizing means being movable on said coupling member to a position deenergizing said spring means and allowing said retaining means to shift from engagement with said seal ring and permit removal of said seal ring from said coupling member.

2. In a coupling device: a coupling member having a sealing surface; a seal ring having a surface adapted to seal against said sealing surface; means for supporting said seal ring on said coupling member comprising retaining means shiftable laterally to and from engagement with said seal ring, spring means engageable with said retaining means, and means on said coupling member for energizing said spring means to cause said spring means to yieldably hold said retaining means in engagement with said seal ring to support said seal ring on said coupling member, said energizing means being movable on said coupling member to a position deenergizing said spring means and allowing said retaining means to shift from engagement with said seal ring and permit removal of said seal ring from said coupling member.

3. In a coupling device: a coupling member having a sealing surface; a seal ring having a surface adapted to seal against said sealing surface; means for supporting said seal ring on said coupling member comprising retaining means engageable with said seal ring and tending inherently to shift laterally outwardly from engagement with said seal ring to release said seal ring from said coupling member, spring means engageable with said retaining means, and means on said coupling member for energizing said spring means to cause said spring means to yieldably force said retaining means laterally inwardly into engagement with said seal ring to support said seal ring on said coupling member, said energizing means being movable on said coupling member to a position deenergizing said spring means and allowing said retaining means to shift laterally outwardly from engagement with said seal ring and permit removal of said seal ring from said coupling member.

4. In a coupling device: a coupling member having a sealing surface; a seal ring having a surface adapted to seal against said sealing surface, said seal ring also having a peripheral groove; means for supporting said seal ring on said coupling member comprising retaining means movable into said peripheral groove and tending inherently to shift laterally outwardly from said groove to release said seal ring from said coupling member, spring means engageable with said retaining means, and means on said coupling member for energizing said spring means to cause said spring means to yieldably force said retaining means laterally inwardly into said seal ring groove to support said seal ring on said coupling member, said energizing means being movable on said coupling member to a position deenergizing said spring means and allowing said retaining means to shift laterally outwardly from said seal ring groove and permit removal of said seal ring from said coupling member.

5. In a coupling device: a coupling member having a sealing surface; a seal ring having a surface adapted to seal against said sealing surface; means for supporting said seal ring on said coupling member comprising retaining means engageable with said seal ring and tending inherently to shift laterally from engagement with said seal ring to release said seal ring from said coupling member, circumferentially spaced springs engageable with said retaining means, and screws threaded in said coupling member and engaging said springs to cause said springs to yieldably force said retaining means into engagement with said seal ring to support said seal ring on said supporting member, said screws being rotatable in said coupling member to a position deenergizing said spring means and allowing said retaining means to shift from engagement with said seal ring and permit removal of said seal ring from said coupling member.

6. In a coupling device: a coupling member having a sealing surface; a seal ring having a surface adapted to seal against said sealing surface, said seal ring having a peripheral groove; means for supporting said seal ring on said coupling member comprising retaining means adapted to be disposed in said seal ring groove and tending inherently to shift laterally outwardly from said groove to release said seal ring from said coupling member, circumferentially spaced springs engageable with said retaining means, and screws threaded in said coupling member and engaging said springs to cause said springs to yieldably force said retaining means laterally inwardly into said seal ring groove to support said seal ring on said coupling member, said screws being rotatable on said coupling member to a position deenergizing said springs and allowing said retaining means to shift laterally outwardly from said seal ring groove and permit removal of of said seal ring from said coupling member.

7. In a coupling device: a coupling member having a sealing surface; a seal ring having a surface adapted to seal against said sealing surface; means for supporting said seal ring on said coupling member comprising a split retaining ring engageable with said seal ring and tending inherently to shift laterally from engagement with said seal ring to release said seal ring from said coupling member, spring means engageable with said retaining ring, and means on said coupling member for energizing said spring means to cause said spring means to yieldably force said retaining ring into engagement with said seal ring to support said seal ring on said coupling member, said energizing means being movable on said coupling member to a position deenergizing said spring means and allowing said retaining ring to shift from engagement with said seal ring and permit removal of said seal ring from said coupling member.

8. In a coupling device: a coupling member having a sealing surface; a seal ring having a surface adapted to seal against said sealing surface, said seal ring having a peripheral groove; means for supporting said seal ring on said coupling member comprising a split retaining ring tending inherently to shift laterally outwardly from said seal ring groove to release said seal ring from said coupling member, spring means engageable with said retaining ring, and means on said coupling member for energizing said spring means to cause said spring means to yieldably force said retaining ring laterally inwardly into said seal ring groove to support said seal ring on said coupling member, said energizing means being movable on said coupling member to a position deenergizing said spring means and allowing said retaining ring to expand laterally outwardly from said seal ring groove and permit removal of said seal ring from said coupling member.

9. In a coupling device: a coupling member having a sealing surface; a seal ring having a surface adapted to seal against said sealing surface, said seal ring having a peripheral groove; means for supporting said seal ring on said coupling member comprising a retaining ring tending inherently to shift laterally outwardly from said seal ring groove to release said seal ring from said coupling member, circumferentially spaced plungers on said coupling member engageable with said retaining ring, circumferentially spaced springs engageable with said plungers, and screws threaded in said coupling member and engaging said springs to cause said springs to yieldably force said plungers inwardly to force said retaining ring into said seal ring groove to support said seal ring on said coupling member, said screws being rotatable in said coupling member to a position deenergizing said springs and allowing said retaining ring to shift inherently laterally outwardly from said seal ring groove and permit removal of said seal ring from said coupling member.

References Cited
UNITED STATES PATENTS

| | | | |
|---|---|---|---|
| 969,207 | 9/1910 | Short | 277—9 |
| 2,257,213 | 9/1941 | Wolfrom | 277—171 X |
| 3,297,344 | 1/1967 | Hanes | 285—141 |

SAMUEL ROTHBERG, *Primary Examiner.*